US006047125A

United States Patent [19]
Agesen et al.

[11] Patent Number: 6,047,125
[45] Date of Patent: Apr. 4, 2000

[54] GARBAGE COLLECTION SYSTEM FOR IMPROVED USE OF MEMORY BY REMOVAL OF REFERENCE CONFLICTS

[75] Inventors: Ole Agesen, Franklin; David L. Detlefs, Westford, both of Mass.

[73] Assignee: Sun Microsystems, Inc., Palo Alto, Calif.

[21] Appl. No.: 08/942,292

[22] Filed: Oct. 1, 1997

[51] Int. Cl.⁷ ..................................................... G06F 9/44
[52] U.S. Cl. .......................... 395/709; 395/200; 395/676; 395/683; 395/670; 707/103; 707/206; 707/201; 711/165; 711/206; 711/100; 711/103
[58] Field of Search ............................ 395/709, 200.51, 395/676, 683, 670, 672, 677, 726, 183, 555; 707/103, 206, 201, 1, 3; 711/165, 206, 100, 103

[56] References Cited

U.S. PATENT DOCUMENTS

| | | | |
|---|---|---|---|
| 4,757,438 | 7/1988 | Thatte et al. | 364/200 |
| 4,907,151 | 3/1990 | Bartlett | 364/200 |
| 4,920,483 | 4/1990 | Pogue et al. | 364/200 |
| 5,129,088 | 7/1992 | Auslander et al. | 395/700 |
| 5,222,221 | 6/1993 | Houri et al. | 395/375 |
| 5,301,288 | 4/1994 | Newman et al. | 395/400 |
| 5,355,483 | 10/1994 | Serlet | 395/650 |
| 5,408,650 | 4/1995 | Arsenault | 395/575 |
| 5,535,329 | 7/1996 | Hastings | 395/183 |
| 5,560,003 | 9/1996 | Nilsen et al. | 395/600 |
| 5,561,786 | 10/1996 | Morse | 395/497 |
| 5,566,321 | 10/1996 | Pase et al. | 395/480 |

OTHER PUBLICATIONS

Krasner, Glenn, "The Smalltalk–80 Virtual Machine" BYTE Publications Inc., Aug. 1991, pp. 300–320.

Diwan, Amer et al. , "Compiler Support for Garbage Collection in a Statically Typed Language," Object Systems Laboratory, Department of Computer Science, University of Massachusetts, Amherst.

Chung, Kin–Man and Yuen, Herbert, "A 'Tiny' Pascal Compiler: the P–Code Interpreter," BYTE Publications, Inc., Sep. 1978.

Chung, Kin–Man and Yuen, Herbert, "A 'Tiny' Pascal Compiler: Part 2: The P–Compiler," BYTE Publications, Inc., Oct. 1978.

Thompson, Ken, "Regular Expression Search Algorithm," Communications of the ACM, vol. II, No. 6, p. 149 et seq., Jun. 1968.

Mitchell, James G., Maybury, William, and Sweet, Richard, Mesa Language Manual, Xerox Corporation.

McDaniel, Gene, "An Analysis of a Mesa Instruction Set," Xerox Corporation, May 1982.

Pier, Kenneth A., "A Retrospective on the Dorado, A High–Performance Personal Computer," Xerox Corporation, Aug. 1983.

Pier, Kenneth A., "A Retrospective on the Dorado, A High–Performance Personal Computer," IEEE Conference Proceedings, The 10th Annual International Symposium on Computer Architecture, 1983.

Jones, Richard and Lins, Raphael, "Garbage Collection, Algorithms for Automatic Dynamic Memory Mangaement," John Wiley & Sons, 1996.

Gosling, James, et al., "The Java Language Specification," Addison–Wesley, 1996. select readings.

Lindholm, Tim and Yellin, Frank, "The java Virtual Machine Specification," select pages Addison–Wesley, 1996.

Lindholm, Tim and Yellin, Frank, "The Java Virutal Machine Specification," Addison Wesley, 1997.

Goslin, James; Joy, Bill; and Steele, Guy, "The Java Language Specification," Addison Wesley, 1996.

Detlefs, David L., Concurrent Garbage Collection for C++, School of Computer Science, Carnegie Mellon University, Pittsburgh, PA, May 4, 1990, pp. 1–46.

Bartlett, Joel F., "Compacting Garbage Collection with Ambiguous Roots," Digital Equipment Corporation, Feb. 1988, pp. 1–35.

Ferreira, Paulo, "Garbage Collection in C++, Position Paper for the OOPSLA '91 Workship on Garbage Collection," Jul. 1991, pp. 1–6.

Gosling, James, "ACM SIGPLAN Workship on Intermediate Representations (IR '95)," Sun Microsystems Laboratories, 1995, pp. 111–118.

Bartlett, Joel F., "Mostly–Copying Garbage Collection Picks Up Generations and C++," WRL Technical Note TN–12, Digital Equipment Corporation, Oct. 1989, pp. 1–13.

Boehm, Hans–Juergen and Weiser, Mark, "Garbage Collection in an Uncooperative Environment," Software—Practice and Experience, vol. 18(9), John Wiley & Sons, Ltd., Sep. 1988, pp. 807–820.

Caplinger, Michael, "A Memory Allocator with Garbage Collection for C," Bell Communication Research, USENIX Winter Conference, Dallas, Texas, Feb. 9–12, 1988, pp. 325–330.

Grehan, Rick, "If Memory Serves . . . ," BYTE Publications, Inc., Aug. 1989.

Grehan, Rick, "Virtually Virtual Memory," BYTE Publications, Inc., Sep. 1990.

Imai, Akira and Tick, Evan, "Evaluation of Parallel Copying Garbage Collection on a Shared–Memory Multiprocessor", IEEE Transactions On Parallel and Distributed Systems, vol. 4, No. 9, Sep. 1993.

(List continued on next page.)

*Primary Examiner*—Tariq R. Hafiz
*Assistant Examiner*—Todd Ingberg
*Attorney, Agent, or Firm*—Finnegan, Henderson, Farabow, Garrett & Dunner, L.L.P.

[57] ABSTRACT

In accordance with the present invention a method for modifying a sequence of instructions to improve memory management within a storage device during execution of the instructions, comprises the steps, performed by a processor, of (a) analyzing the sequence of instructions for a conflict indicating an undeterminable variable type, (b) determining the type of conflict, and (c) modifying the sequence of instructions to eliminate the conflict based on the determination.

29 Claims, 10 Drawing Sheets

OTHER PUBLICATIONS

Kuechlin, Wolfgang W. and Nevin, Nicholas J., "On Multi-Threaded List-Processing and Garbage Collection," IEEE, 1991.

Harbaugh, Sam and Wavering, Bill, "HeapGuard™ Eliminating Garbage Collection in Real-Time Ada Systems," Integrated Software, Inc.

Bott, Ed, "Windows' Invisible Wall: The 64K Barrier," PC Contact, Mar. 1994.

Karen, et al., "Garbage Collection for Prolog based on WAM," Communications of the ACM, vol. 31, Issue 6, Jun. 1988.

Wallace, David V., and Tiemann, Michael, "Simple Garbage Collection in G++," Cygnus Support.

Caro, Alexander, "A Novel 64 Bit Data Representation for Garbage Collection and Synchronizing Memory", Computation Structures Group Memo 396, Apr. 9, 1997.

Courts, Robert, "Improving Locality of Reference in a Garbage-Collecting Memory Management System," Communications of the ACM, vol. 31, No. 5, Sep. 1988.

Moon, David A., "Garbage Collection in a Large Lisp System," Association for Computing Machinery, 1984.

Barrett, David A., "Improving the Performance of Conservative Generational Garbage Collection," Technical Report CU-CS-784-95, University of Colorado at Boulder, Sep. 1995.

Aho, Alfred V., Sethi, Ravi, and Ullman, Jeffrey D., "Compilers: Principles, Techniques, and Tools," Addison-Wesley Publishing Company, 1988; Copyright © 1986 by Bell Telephone Laboratories, Inc.

Hölzle, Urs, "A Fast Write Barrier for Generational Garbage Collectors," OOPSLA '93 Garbage Collection Workshop, Washington, DC, Oct. 1993.

"GC FAQ—draft," http://www.centerline.com/people/chae/GC/GC-faq.html, Jan. 6, 1997.

Shaw, Richard H., "An Introduction to the Win32 API (Programming Specification, Application Programming Interface, Power Programming)," PC Magazine, Apr. 26, 1994.

Wilson, Paul R., et al., "Dynamic Storage Allocation: A Survey and Critical Review," Department of Computer Sciences, University of Texas at Austin, Austin, Texas.

Gosling, James, et al., "ACM SIGPLAN Workshop on Intermediate Representations," Sun Microsystems Laboratories, 1995.

Wilson, P.R., et al., "Design of the Opportunistic Garbage Collector," Proceedings of the Object Oriented Programming Systems Languages An Applications Conference, New Orleans, vol. 24, No. 10, Oct. 1989.

```
                                               800
                           ┌─810
0:      iconst_null◄┘
        astore 1◄
        inconst 1      ─820
        istore 3
        invokestatic #tryItOut
        getstatic #I
        iload 3
        iadd
        putstatic #I
        new #B
        dup
        invokespecial #<init>
        astore 4◄─────── 830
        invokestatic #tryItOut
        aload 4◄─────── 840
        invoke virtual #useIt
        jsr #H
n:      return E:      astore 1
        jsr #H
        aload 1
        athrow H:      astore 2
        invokestatic #wrapItUp
        ret 2

Exception table:
        0-n, any: E
```

*FIG. 8*

GARBAGE COLLECTION SYSTEM FOR IMPROVED USE OF MEMORY BY REMOVAL OF REFERENCE CONFLICTS

BACKGROUND OF THE INVENTION

A. Field of the Invention

This invention generally relates to garbage collection for computer systems and, more particularly, to a methodology for determining the existence of reference conflicts in Java bytecodes and for modifying the bytecodes to eliminate the conflicts, thereby improving the performance of garbage collection.

B. Description of the Related Art

An important concept in memory management of computer systems is the way in which memory is allocated to a task, deallocated, and then reclaimed. Memory deallocation and reclamation may be explicit and controlled by an executing program, or may be carried out by another special purpose program which locates and reclaims memory which is unused, but has not been explicitly deallocated. "Garbage collection" is the term used to refer to a class of algorithms used to carry out memory management, specifically, automatic reclamation. There are many known garbage collection algorithms, including reference counting, mark-sweep, and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996. Unfortunately, many of the described techniques for garbage collection have specific requirements which cause implementation problems.

The Java™ programming language is an object-oriented programming language that is described, for example, in a text entitled "The Java Language Specification" by James Gosling, Bill Joy, and Guy Steele, Addison-Wesley, 1996. This language is typically compiled to a universal executable format, using a "bytecode instruction set," which can be executed on any platform supporting the Java virtual machine (JVM). The JVM is described, for example, in a text entitled "The Java Virtual Machine Specification," by Tim Lindholm and Frank Yellin, Addison Wesley, 1996.

The JVM may stop an executing program at many bytecode boundaries to execute a garbage collector and optimize memory management in accordance with the collector's algorithm. The difficulty with this scheme, however, is providing accurate information for garbage collection at all points where collection is required.

In an object-oriented system, such as one or more related programs written in Java, a "class" provides a template for the creation of "objects" (which represent items or instances manipulated by the system) having characteristics of that class. The term template denotes that the objects (i.e., data items) in each class, share certain characteristics or attributes determined by the class. Objects are typically created dynamically during system operation. Methods associated with a class generally operate on the objects of the same class.

An object may be located by a "reference," or a small amount of information that can be used to access the object. One way to implement a reference is by means of a "pointer" or "machine address," which uses multiple bits of information, however, other implementations are possible. Objects can themselves contain primitive data items, such as integers or floating point numbers, and/or references to other objects. In this manner, a chain of references can be created, each reference pointing to an object which, in turn, points to another object.

Garbage collection algorithms generally determine reachability of objects from the references held in some set of roots. When an object is no longer reachable, the memory that the object occupies can be reclaimed and reused even if it has not been explicitly deallocated by the program. To be effective, garbage collection techniques should be able to, first, identify references that are directly accessible to the executing program, and, second, given the reference to an object, identify references contained within that object, thereby allowing the garbage collector to transitively trace chains of references.

In most language implementations, stacks form one component of the root set. A stack is a region of memory in which stack frames may be allocated and deallocated. In typical object-oriented systems, each method executing in a thread of control allocates a stack frame, and uses the slots of that stack to hold the values of local variables. Some of those variables may contain references to heap-allocated objects. Such objects must be considered reachable as long as the method is executing. The term stack is used because the stack frames obey a last-in/first-out allocation discipline within a given thread of control. There is generally a stack associated with each thread of control.

A garbage collector may be exact or conservative in how it treats different sources of references, such as stacks. A conservative collector knows only that some region of memory (e.g., a slot in the stack frame) may contain references, but does not know whether or not a given value in that region is a reference. If such a collector encounters a value that is a possible reference value, it must keep the referenced object alive. Because of the uncertainty in recognizing references, the collector is constrained not to move the object, since that would require updating the reference, which might actually be an unfortunately-valued integer or floating-point number. The main advantage of conservative collection is that it allows garbage collection to be used with systems not originally designed to support collection. For example, the collectors described in Bartlett, Joel F., mostly-Copying Collection Picks Up Generations and C++, Technical Report TN-12, DEC Western Research Laboratory, October 1989, and Boehm, Hans Juergen and Weiser, Mark, Garbage Collection in an Uncooperative Environment. *Software-Practice & Experience,* 18(9), p. 807–820, September 1988, use conservative techniques to support collection for C and C++ programs.

In contrast, a collector is exact in its treatment of a memory region if it can accurately distinguish references from non-reference values in that region. Exactness has several advantages over conservatism. A conservative collector may retain garbage referenced by a non-reference value that an exact collector would reclaim. Perhaps more importantly, an exact collector is free to relocate objects referenced only by exactly identified references. In an exact system, one in which references and non-references can be distinguished everywhere, this enables a wide range of useful and efficient garbage-collection techniques that cannot easily be used in a conservative setting.

However, a drawback of exact systems is that they must provide the information that makes them exact, i.e., information on whether a given value in memory is a reference or a primitive value. This may introduce both performance and complexity overhead. For purposes of this description, "val" is used to refer to a primitive data item, such as an integer or a floating point number, that does not function as a reference ("ref").

One technique for providing information distinguishing references from primitive values in exact systems is "tagging," in which values are self-describing: one or more bits in each value is reserved to indicate whether the value is a reference. The MIT LISP Machine was one of the first architectures which used garbage collection and had a single stack with explicitly tagged memory values. Its successor, the Symbolics 3600, commercially available from Symbolics Inc., Cambridge, Mass., also used explicitly tagged memory values.

If tagging is not used, then the system must associate data structures with each memory region allowing references and non-references to be distinguished in that region. For example, each object may start with a reference to a descriptor of the type of the object, which would include a "layout map" describing which fields of the object contain references. Stack frames also contain references, and if the JVM were to offer exact garbage collection it must be able to distinguish slots in the frame assigned to variables that contain references from those that contain primitive values. A "stack map" is a data structure that, for each execution point at which a collection may occur, indicates which slots in the stack frame contain references.

The layout map of an object is associated with the object type such that all objects of a given type have the same layout map, and the map of an object is the same for its entire lifetime. In contrast, the layout of a stack frame may change during its lifetime. A given stack frame slot may be uninitialized at the start of a method, hold a reference for one block in the method, then hold an integer for another block. This introduces certain difficulties in relying on the stack maps for determining appropriate garbage collection points.

For example, a compiler may translate a program fragment of a method such that two variables, one representing a primitive value and the other representing a reference, are mapped to the same slot in the stack frame. In fact, whether a given stack frame slot contains a reference at a given point in a method execution may depend not only on the current point in the program execution but also on the control path leading to that point. Along one control path, the stack frame slot might be assigned a primitive value, while along another path the same slot might be assigned a reference. That fact that there are two possibilities makes it impossible to use a stack map to determine the stack layout at garbage collection points.

In general, program code written in the Java language is compiled by a Java compiler, and the compiled program consists of the bytecodes that are executed by the JVM. However, not all Java programs need go through the same compiler. Moreover, it is possible to construct a bytecode program directly, using tools such as "Java assemblers," bypassing a compiler altogether. Thus, Java source code is not the exclusive source of bytecodes executable by the JVM. Consequently, the JVM Specification lays out a set of rules defining well-formed Java class files, along with a description of a procedure called the "bytecode verifier" for checking adherence to those rules. According to one of these rules, the verifier rejects instructions that do not satisfy predetermined constraints. For example, the iadd bytecode causes the JVM to pop the top two elements of the operand stack used for method execution, add the values together, and push the result on the top of the operand stack. However, the verifier knows that the iadd bytecode constraint requires that the top two elements on the operand stack be integers.

If the verifier cannot prove that a method in a class file pushes two integers on the operand stack before executing an iadd instruction, the verifier will reject that class file.

Consider the case of a method that has two control paths leading to the same instruction I, which uses some local (i.e., stack-allocated) variable v. If I places some constraint on v, the verifier must prove that this constraint is met no matter which control path reaches I. Thus, when two control paths join at a common instruction, the verifier must show that subsequent constraints on variables such as v are satisfied assuming only the least general type for v that describes the value assigned along both control paths. This least general type describing both possible types of v is called the "merge" of its types along the two paths.

The JVM explicitly allows one exception to this control path rule to accommodate the Java bytecode instruction set for a pair of operations called jsr and ret. The jsr instruction jumps to an address specified in the instruction and pushes a return address value (i.e., the address of the instruction immediately following the jsr) on the operand stack of the current method. The ret instruction specifies a local variable that must contain a return address, and jumps to that return address. The intended use of these bytecodes is in the implementation of the try {body} finally {handler} construct of the Java language, in which the instructions included in the finally's handler are executed no matter how the try's body is exited. The Java compiler translates the handler as a jsr subroutine within the method. Every instruction that exits try's body, such as a return statement (when the bytecodes for body are completed normally) or throw statement (when the bytecodes for body "throw" an exception representing an error condition to be handled by a "universal error handler"), are preceded in the translation by a jsr to that subroutine, which would store the pushed return address in a local variable, perform the work of the handler, then perform a ret. Although a jsr subroutine resembles a real method, there is a crucial difference: it executes in the same stack frame as its containing method and has access to all the local variables of this method.

According to the exception for verification of jsr subroutines, the bytecode verifier permits a local variable v that is neither read nor written in a jsr to retain its type across a jsr to that subroutine. This exception causes difficulty for implementing exact garbage collection in the JVM.

Consider the case shown in FIG. 1 in which there are two jsr's, one from PATH A and a second from PATH B, leading to the same jsr subroutine C. At the jsr from PATH A, a local variable $r_3$ is used to hold an integer value (7), and at the other jsr from PATH B, $r_3$ holds a reference (to a location holding the string "HI"). Assume that the jsr subroutine C does not use r3 in any way. In this case, the exception for jsr subroutines allows each of PATH A and PATH B to assume that r3 is of the appropriate type for its use after return from the jsr. However, should a garbage collection occur at gc point while a thread is in the jsr subroutine C, the JVM is unable to determine from the stack map whether $r_3$ contains a reference. Thus, the path leading to the subroutine constitutes the determinative factor for the contents of $r_3$. If $r_3$ contains a reference then the garbage collector must process it as a reference; otherwise, it should ignore $r_3$. Similarly, as shown in FIG. 2, the stack map is unclear as to the contents of $r_3$; from PATH B the variable contains a reference but from PATH A the variable is not initialized.

Simply ignoring these conflicts (i.e., the ref-val conflict and ref-uninit conflict) by disallowing garbage collections for the duration of the jsr subroutine is not an option since try-finally handlers can perform arbitrary computation, including calling methods that may execute indefinitely and allocate an unbounded number of objects. Accordingly, there is a need for a technique to eliminate the ref-val and ref-uninit conflicts associated with bytecodes defining two control paths leading to the same sequence of instructions, such as a subroutine, where it is generally not possible to determine whether a variable contains a reference during execution of the subroutine due to the existence of either type of conflict.

SUMMARY OF THE INVENTION

Methods and systems consistent with the present invention improve garbage collection by modifying code that introduces a conflict in the assignment of variables for identifying references. The conflict exists, for example, when a method includes code defining at least two control paths leading to a common subroutine and the garbage collector initiated during execution of the subroutine cannot determine whether a variable represents a reference. By rewriting the code in accordance with the principles of the present invention to eliminate the conflicts, the collector is able to reclaim memory space effectively during execution of the subroutine.

In accordance with the present invention, as embodied and broadly described herein, a method for modifying a sequence of instructions to improve memory management within a storage device during execution of the instructions, comprises the steps, performed by a processor, of (a) analyzing the sequence of instructions for a conflict indicating an undeterminable variable type, (b) determining the type of conflict, and (c) modifying the sequence of instructions to eliminate the conflict based on the determination.

In accordance with another aspect of the present invention, as embodied and broadly described herein, a method for generating a sequence of bytecodes for execution by a virtual machine, comprises the steps of determining whether the bytecode set includes bytecodes defining two paths branching to a routine, determining whether a variable assignment from each path causes a conflict of unknown variable type in the routine, and modifying all bytecodes of one of the paths that cause the conflict with a new variable assignment.

In accordance with another aspect of the present invention, as embodied and broadly described herein, a method for generating bytecodes executable by a virtual machine, comprises the steps of analyzing a sequence of bytecodes for bytecodes defining two paths in which at least one bytecode of one path uses a variable to store a primitive value and at least one bytecode of the other path uses the variable to store a reference, determining whether both paths branch to a routine comprised of a subset of the sequence of bytecodes, and modifying the bytecode of one of the paths to use a different variable.

In accordance with yet another aspect of the present invention, as embodied and broadly described herein, a method for modifying a sequence of instructions to improve memory management within a storage device during execution of the instructions by a virtual machine, comprises the steps of preprocessing a sequence of instructions, identifying a first subset of the sequence of instructions that uses a storage location for a value, identifying a second subset of the sequence of instructions that uses the storage location for a reference, determining whether both subsets branch to a routine comprised of a third subset of the sequence of instructions, and modifying instructions from the first or second subset to use a new storage location.

In accordance with still another aspect of the present invention, as embodied and broadly described herein, a method for modifying a sequence of instructions executable by a virtual machine, comprises the steps of preprocessing a sequence of instructions, identifying a first subset of the sequence of instructions that uses a variable for a reference, identifying a second subset of the sequence of instructions, determining whether both subsets branch to a routine comprised of a third subset of the sequence of instructions, and adding at least one instruction to the sequence of instructions to initialize the variable based on whether the variable is used by an instruction in the second subset.

BRIEF DESCRIPTION OF THE DRAWINGS

The accompanying drawings, which are incorporated in and constitute a part of this specification and, together with the description, serve to explain the advantages and principles of the invention. In the drawings.

FIG. 8 is an example of bytecodes without the conflicts shown in the bytecodes of FIG. 7, which conflicts were corrected in accordance with the present invention.

DETAILED DESCRIPTION

The following detailed description of the invention refers to the accompanying drawings. The description includes exemplary embodiments, other embodiments are possible, and changes may be made to the embodiments described without departing from the spirit and scope of the invention. The following detailed description does not limit the invention. Instead, the scope of the invention is defined by the appended claims.

Systems consistent with the present invention address the requirements of exact garbage collection algorithms. Specifically, such systems enable exact garbage collectors to distinguish references from non-references within a stack in situations where heretofore such distinctions were not possible because of variable assignment conflicts. The conflicts are caused by certain conditions set by rules and exceptions dictated by Java's bytecode verifier. They made it impossible for a collector, which relies on only the program counter to determine the stack map to use, to determine conclusively whether a local variable with an assigned stack frame slot represents a reference. Such conflicts are eliminated by rewriting selected bytecodes to refer to a different variable or adding additional bytecodes to initialize the variable, thus improving operation of the garbage collector.

Although the illustrative embodiments of systems consistent with the present invention are described with reference to a computer system implementing the Java programming language on the JVM specification, the invention is equally applicable to other computer systems having similar requirements. Specifically, the invention may be implemented with both object-oriented and nonobject-oriented programming systems. Further, the invention may be implemented with systems having single threads and single data stacks as well as with multi-threaded systems, having multiple simultaneous program stacks. Prior to describing the invention in detail, the descriptions of computer systems suitable for use with the present invention and a program stack structure are provided for the reader's benefit.

Computer System and Program Stack Architecture

Figure 3A:
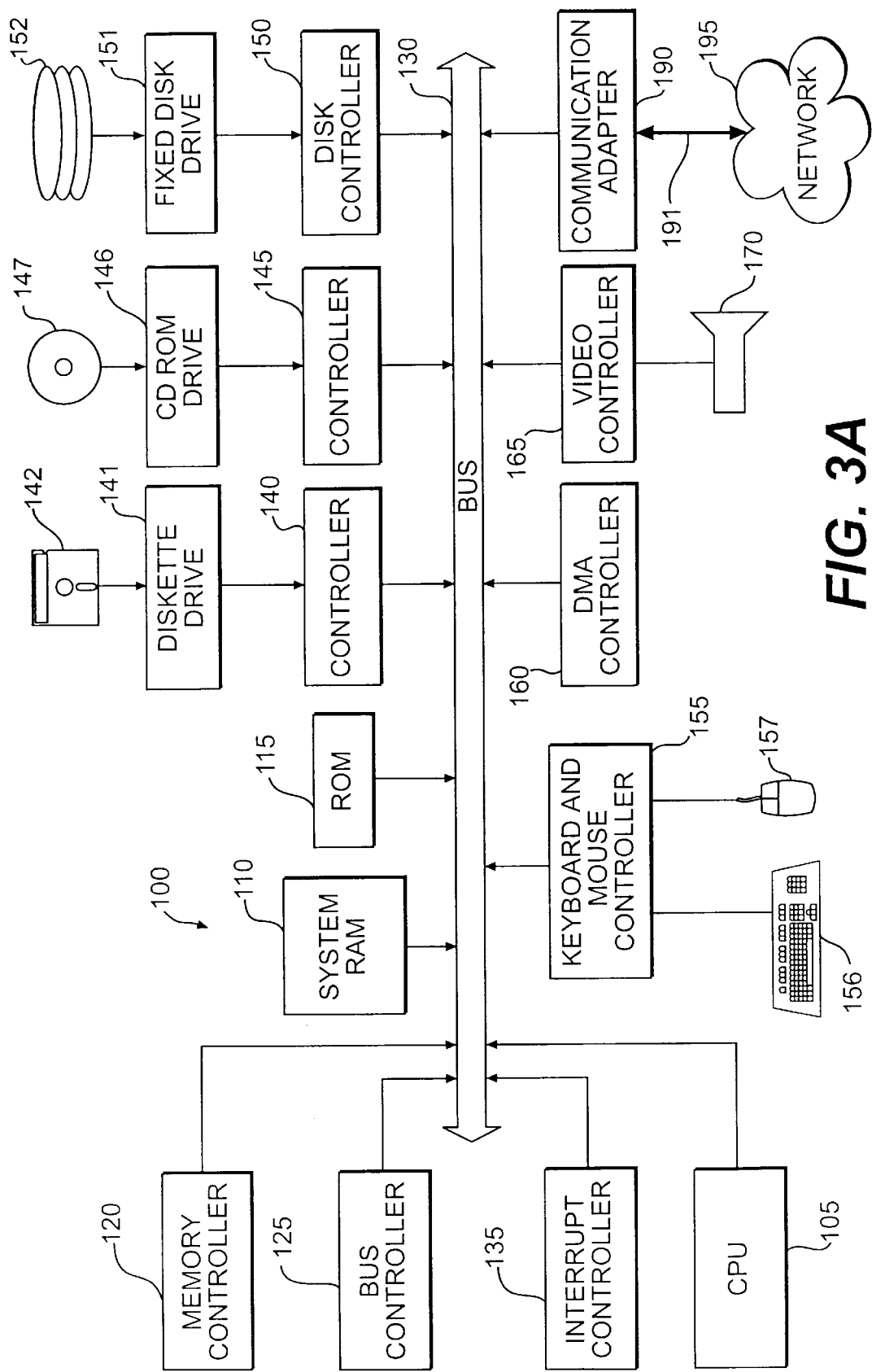
FIG. 3A is a schematic block diagram illustrating a computer architecture suitable for use with the present invention.

FIG. 3A illustrates the system architecture for a computer system with which the invention may be implemented. The exemplary computer system of FIG. 3A is for descriptive purposes only. Although the description may refer to terms commonly used in describing particular computer systems, such as in IBM PS2 personal computer, the description and concepts equally apply to other computer systems such as network computers, work stations, and main frame computers having architectures dissimilar to FIG. 3A.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. Interrupt controller 135 is used for receiving and processing various interrupt signals from the system components.

Mass storage may be provided by diskette 142, CD ROM 147, or a hard disk drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151, which is connected to bus 130 by controller 150.

User input to computer system 100 may be provided by a number of devices. For example, a keyboard 156 and mouse 157 are connected to bus 130 by controller 155. It will be obvious to those skilled in the art that other input devices such as an audio transducer may be connected to bus 130 via an appropriate controller.

DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating a system software, which may be single or multiple threaded. The operating system controls allocation of system resources and performs tasks such as process scheduling, memory management, networking, and I/O services, among other things.

In computing systems with which the invention may be implemented, an ongoing computation uses a "program stack" or "stack," to support procedure calls and to hold intermediate computational quantities such as references, and primitive values. FIG. 3B illustrates conceptually the structure of a conventional program stack implemented in system memory. Three important positions in memory define the stack: the stack base, the stack pointer, i.e., the current stack top, and the stack limit. Typically, these positions are identified by memory addresses kept in three machine registers.

When a datum is pushed onto the stack, it is stored into the unused memory location nearest the stack pointer. The stack pointer is then advanced toward the stack limit. If the stack pointer is too close to the stack limit, the stack is said to "overflow" and some special action must be taken, e.g., signal and error or allocate more memory to hold the stack.

When a datum is popped from the stack, the stack pointer recedes toward the stack base, causing the memory that holds the datum to become regarded as unused memory again. If the stack pointer is too close to the stack base, the stack is said to "underflow" and some special action must be taken, e.g., signal an error. Depending on the implementation, the stack base may reside at either a higher or lower memory address than the stack limit.

Figure 3C:
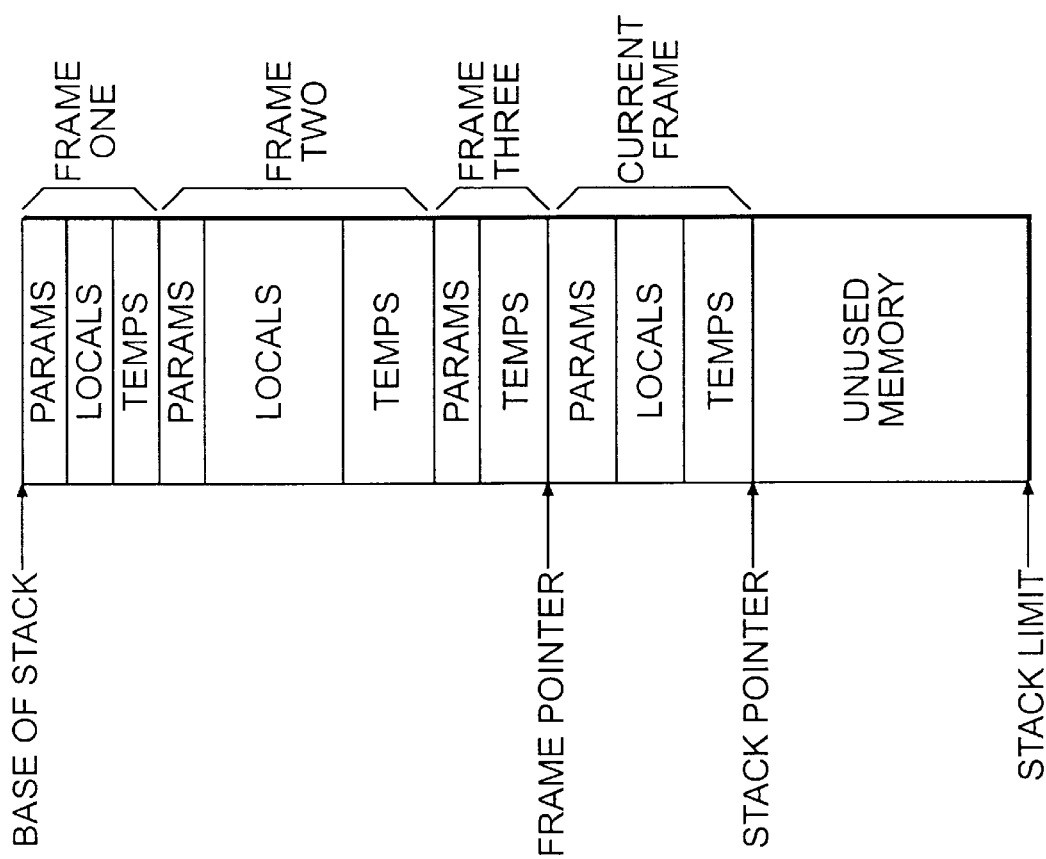
FIG. 3C is a conceptual illustration of a program stack, including frames, suitable for use with the present invention.
Figure 3B:
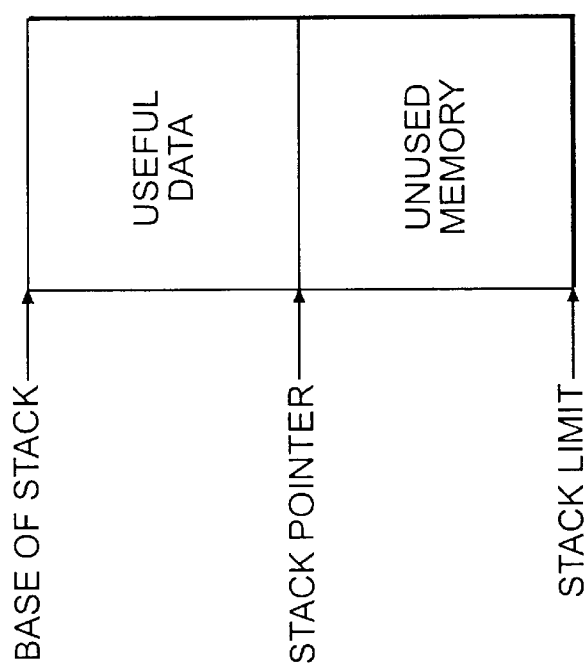
FIG. 3B is a conceptual illustration of a program stack.

In most implementations of the Java programming language, data on the program stack is grouped into "frames," as illustrated in FIG. 3C. Each frame corresponds to one level of method invocation. Every frame is divided into three regions: parameters, local variables, and evaluation temporaries. Parameters are closest to the stack base while the evaluation temporaries are furthest from the stack base. Each of these three regions may be empty, depending on the particular subroutine to be executed with that frame. As the subroutine executes, the number of evaluation temporaries may vary as items are pushed onto or popped from the stack, however, the number of parameters and local variables typically does not vary. For purposes of this description, the term "operand stack" is used to refer to the portion of each stack frame used for evaluation temporaries.

To simplify addressing of parameters in local variables, an additional address, the "frame pointer," typically kept in a machine register, indicates the start of the parameter area in the active stack frame. Instructions can then access a parameter or local variable in the active frame by specifying an offset from the active frame pointer.

When the method is invoked, some items at the top of the operand stack become parameters within the new frame. In other words, the newly invoked method uses data items from its calling method. The active frame pointer is saved on this stack along with the program counter. The frame pointer is then loaded with the address of the new frame while the program counter is loaded with the address of the code for the method.

Figure 3D:
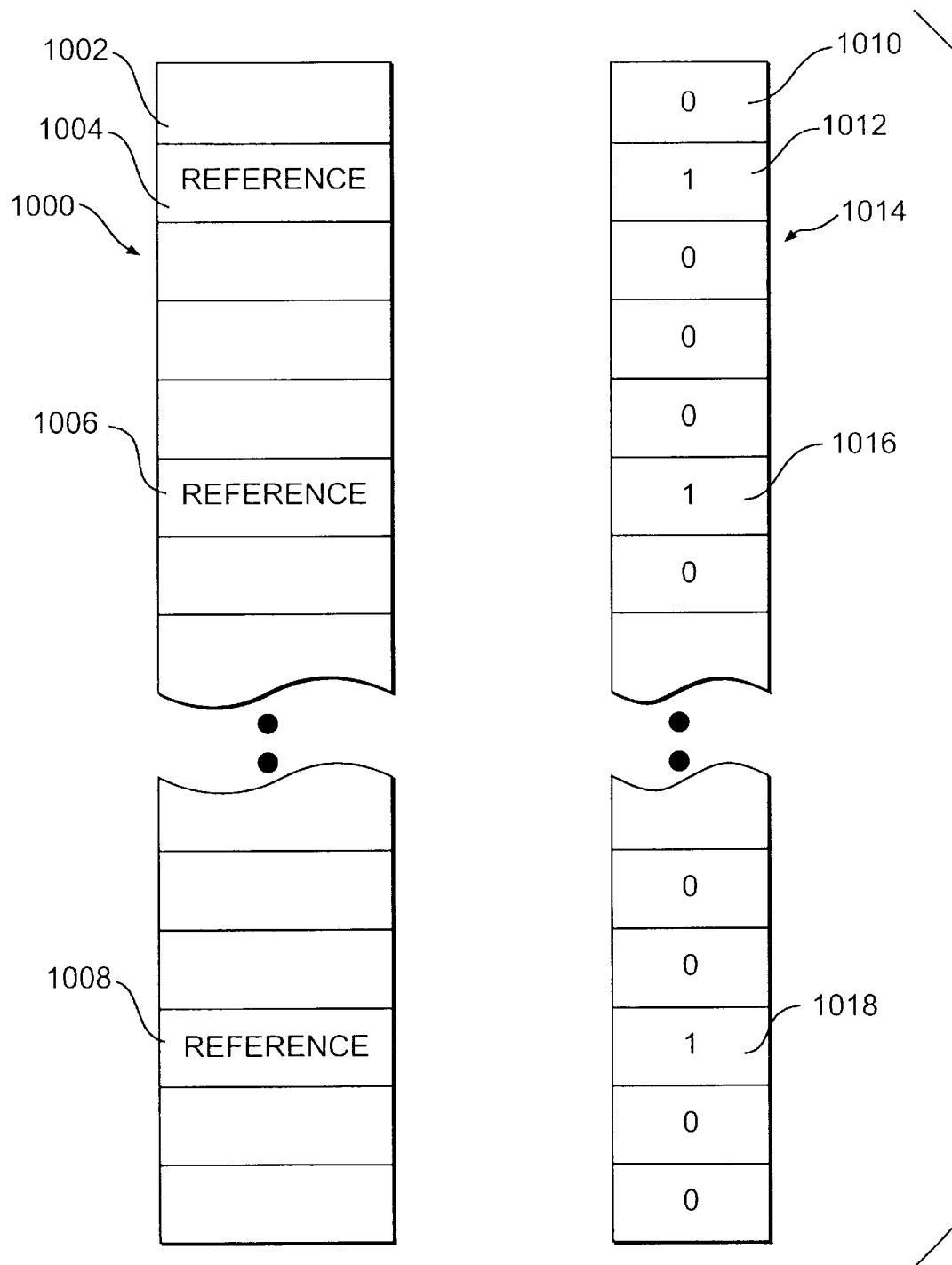
FIG. 3D is a conceptual illustration of a program stack with reference locations represented by a bit vector.

A technique by which references are designated on a stack is shown in FIG. 3D, which illustrates a logical stack 1000 and accompanying stack map or bit vector 1014. While stack 1000 is conceptually shown as a block of contiguous memory locations, an actual stack may be comprised of several non-contiguous blocks of memory. However, for purposes of this description, the stack acts logically as a single contiguous block of memory. Each memory location, for example memory location 1002, can hold a variety of information, including different data types and references or pointers. As previously mentioned, the location of references are important to garbage collection, which must either modify or follow the references.

In FIG. 3D memory locations designated as 1004, 1006, and 1008 illustratively contain reference information. The location of the references in a stack is mapped by bit vector 1014, which contains a bit for each location in the stack. For example, bit 1010 corresponds to location 1002 and bit 1012 corresponds to location 1004. As shown in FIG. 3D, the bits in the bit vector have been set in locations corresponding to the references locations, thus bit vector 1014 has locations 1012, 1016, and 1018 set in order to indicate that the corresponding stack location contains a reference. Programs, such as garbage collectors, which need to access the references can then examine the bit vector to determine which corresponding stack locations contain references even though the actual data in the stack locations does not positively identify references.

Although this description focuses on references stored in the stack frame, Java implementations may use machine registers to store references and primitive values to further improve execution time. Assignment of primitive values and references to these machine registers can also result in instances of ref-val and ref-uninit conflicts, and those skilled in the art will recognize that the methodology described herein may be used to resolve such conflicts.

Code Rewriter

Figure 4:
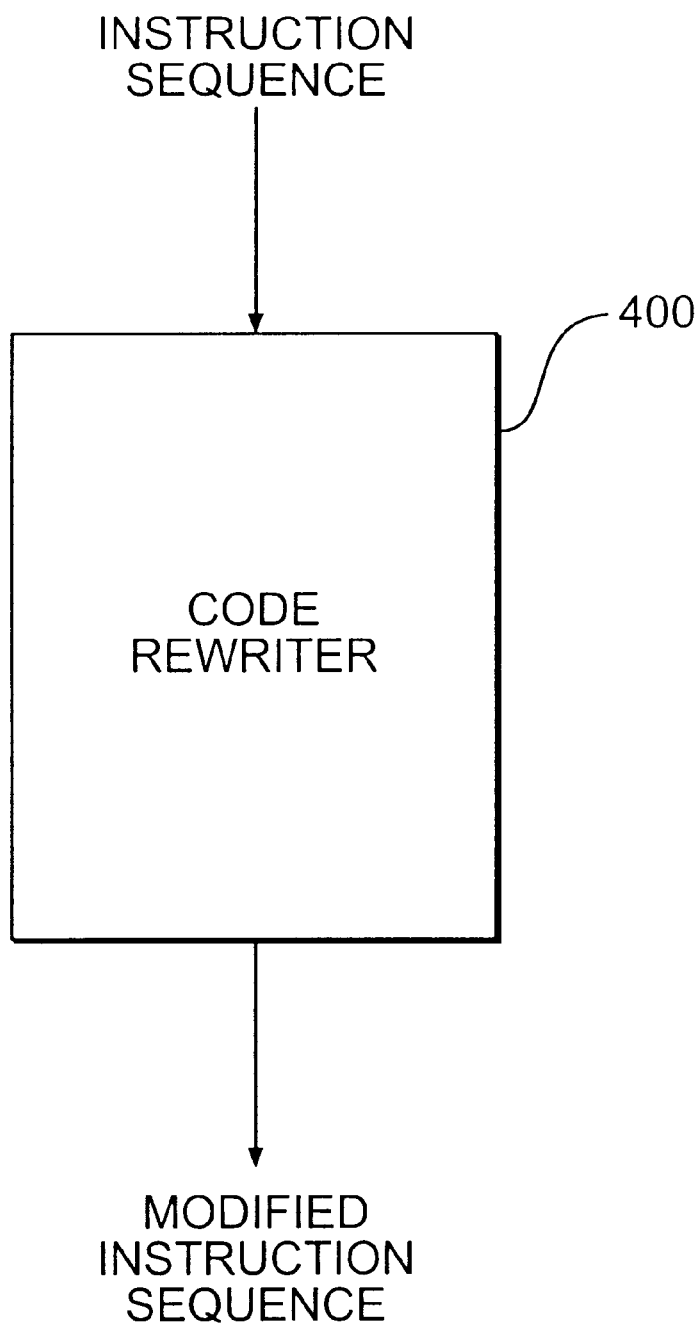
FIG. 4 illustrates a code rewriter consistent with the present invention.

Systems consistent with the present invention include a code rewriter in a virtual machine, such as the JVM. As shown in FIG. 4, the input to code rewriter 400 includes an instruction sequence, i.e., bytecodes, that have passed a bytecode verification process and, as such, satisfies syntax and other constraints. In general, code rewriter 400 determines whether any ref-val or ref-uninit conflicts are present in the bytecodes and modifies the instruction sequence to eliminate such conflicts. It eliminates ref-val conflicts by changing variable assignments such that bytecodes creating such conflicts do not refer to the same local variable. In the case of ref-uninit conflicts, code rewriter 400 adds bytecodes to the instruction sequence to initialize the variables creating such conflicts.

Conflict Elimination Process

Figure 5:
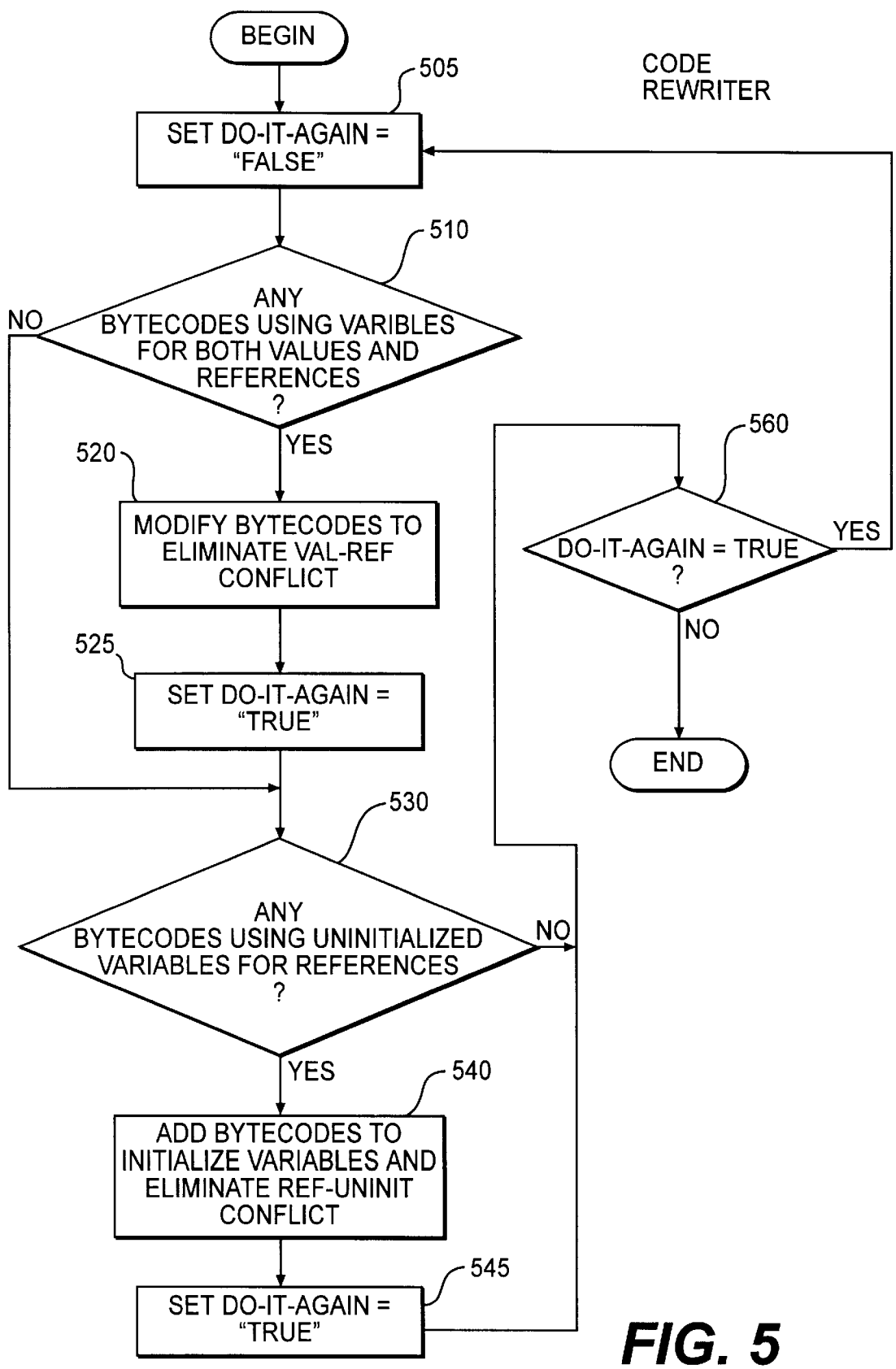
FIG. 5 is a flowchart of the steps performed by the code rewriter consistent with the present invention.

FIG. 5 is a flowchart of the steps performed by code rewriter 400 to locate and eliminate both ref-val and ref-uninit conflicts. First, code rewriter 400 sets a variable named "DO-IT-AGAIN" to "FALSE" (step 505). Those skilled in the art will recognize that the DO-IT-AGAIN variable used to make sure the process steps are repeated until all ref-val and ref-uninit conflicts are eliminated from the code.

Figure 1:
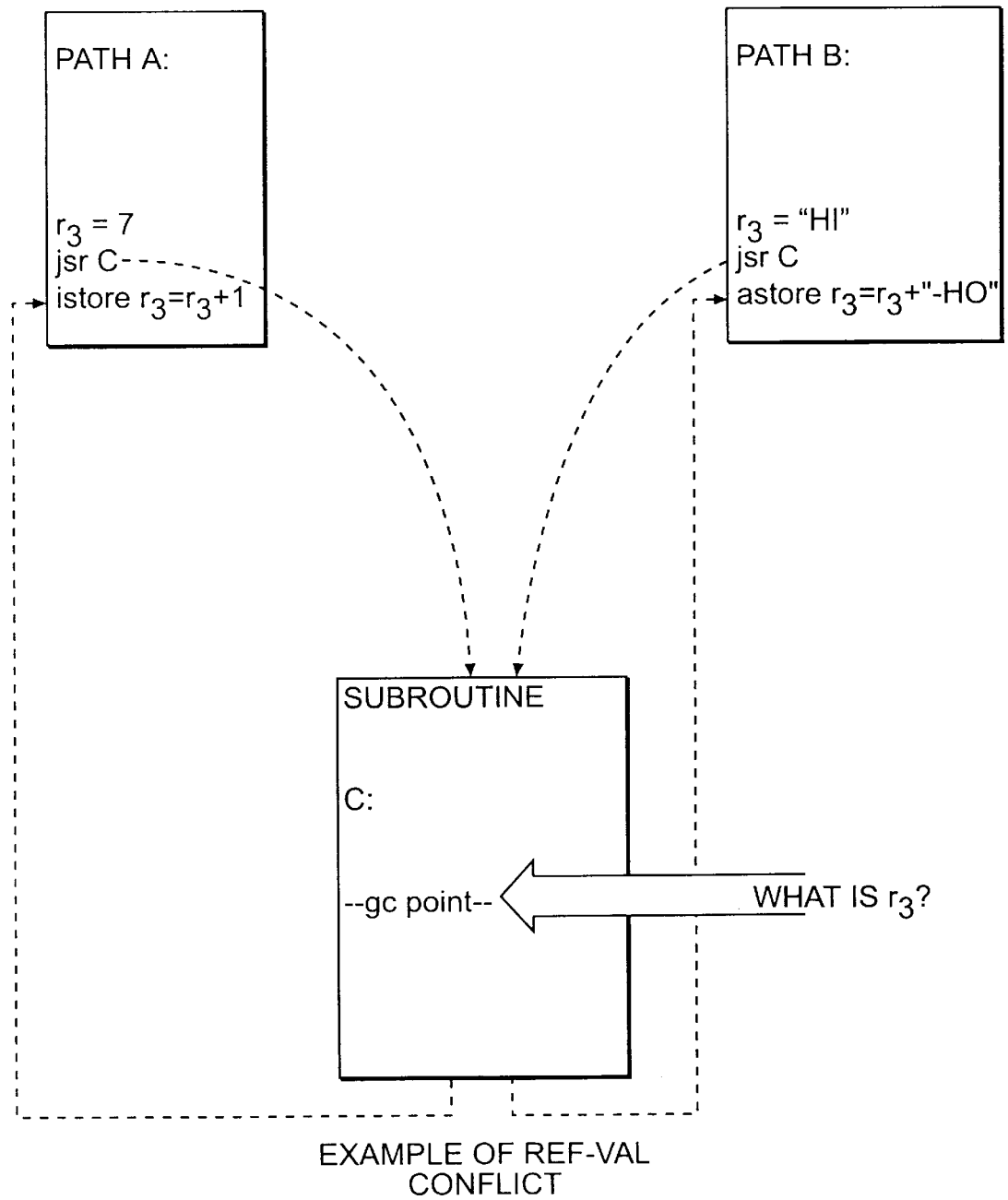
FIG. 1 is a block diagram of program flow used to explain a reference-primitive value conflict for garbage collection.
Figure 2:
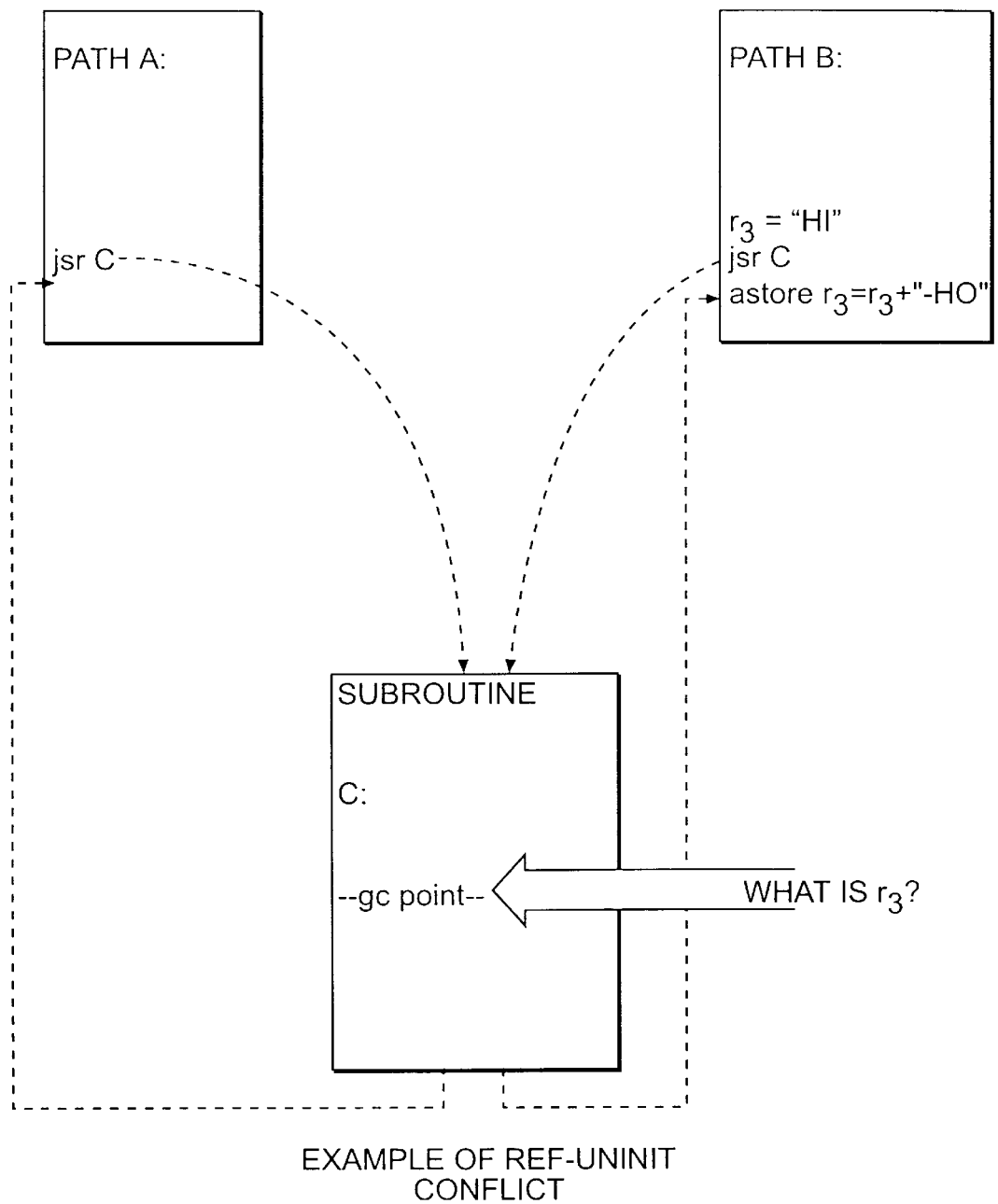
FIG. 2 is a block diagram of program flow used to explain a reference-uninitialized variable conflict for garbage collection.

Next, code rewriter 400 examines an input set of bytecodes for ref-val conflicts (step 510) and, if any conflicts are located, code rewriter 400 modifies the bytecodes to eliminate those conflicts (step 520). Ref-val conflicts are eliminated by modifying bytecodes from one of the paths creating the conflict to refer to a local variable different from the unchanged bytecodes in the other path. For example, in the conflict example shown in FIG. 1, the variable $r_3$ in PATH B may be changed to variable $r_4$, or the variable $r_3$ in PATH A may be changed to variable $r_4$. If there are any ref-val conflicts, code rewriter 400 sets the DO-IT-AGAIN variable to "TRUE" (step 525).

Similarly, code rewriter 400 examines an input set of bytecodes for ref-uninit conflicts (step 530) and, if any conflicts are located, code rewriter 400 modifies the bytecodes to eliminate those conflicts (step 540). Ref-uninit conflicts are eliminated by adding bytecodes before both of the paths creating the conflict to initialize the variable causing the conflict. Code rewriter 400 then sets the DO-IT-AGAIN variable to "TRUE" (step 545).

Code rewriter 400 then tests the contents of DO-IT-AGAIN (step 560). If DO-IT-AGAIN was set to "TRUE" in either step 525 or step 545, flow returns to step 505. This ensures that code rewriter 400 repeats the process until all ref-val and ref-uninit conflicts are eliminated from the bytecodes, including any conflicts created during conflict elimination (steps 520 and 540) of a previous iteration. Otherwise, DO-IT-AGAIN is "FALSE", and the process is complete.

EXAMPLE

The following example provides a further understanding of the conflict resolution process that eliminates the ref-val and ref-uninit conflicts from bytecode sequences. As explained, conflicts generally arise in bytecodes corresponding to the Java try-finally instruction, although other bytecode sets, including those resulting from other Java instructions, may also cause conflicts.

Figure 6:
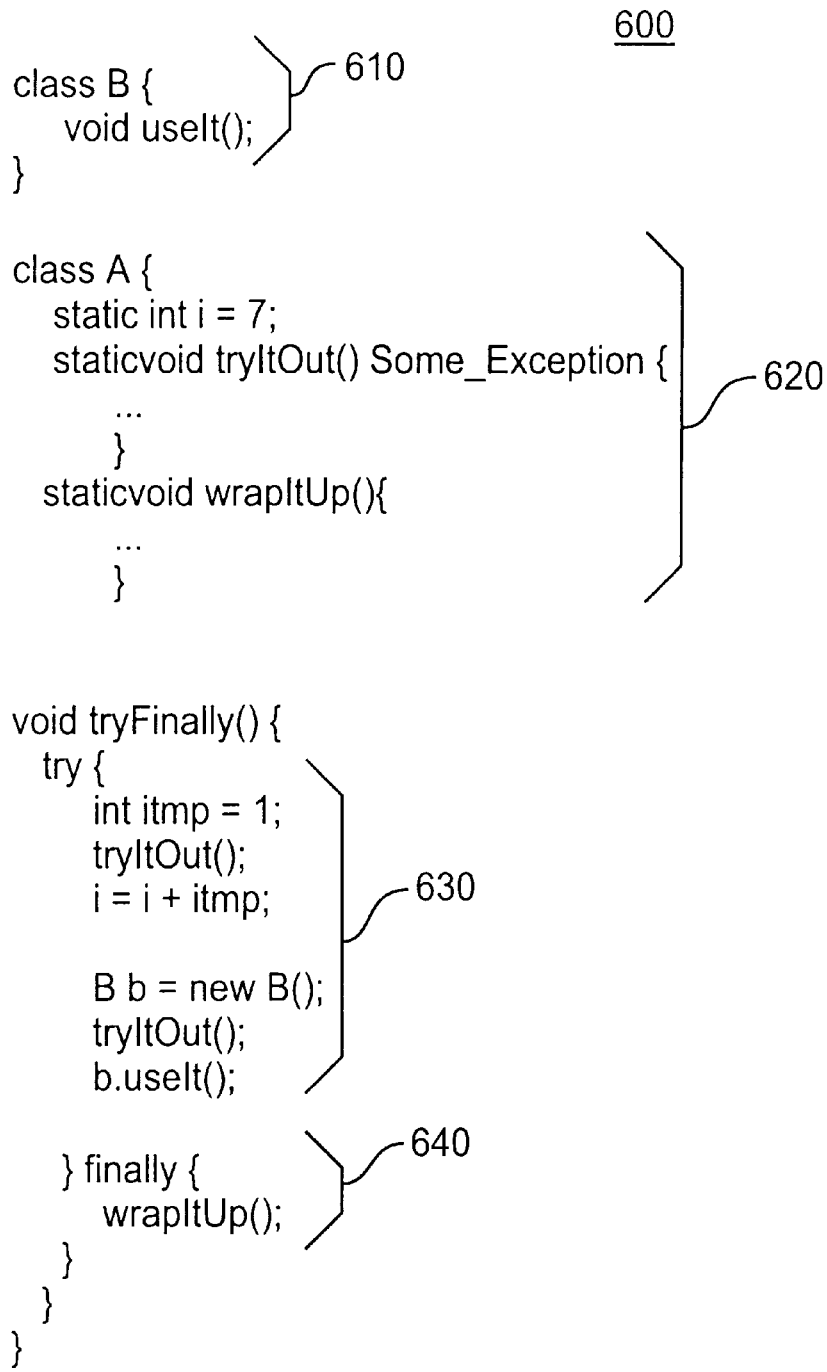
FIG. 6 is an example of program code written in the Java language that includes a try-finally instruction.

FIG. 6 shows an example of the Java instructions for a method 600 that includes a try-finally clause. Instructions 610 and 620 are statements used to declare objects of two classes A and B, respectively. Instructions 630 constitute the body of the try and instructions 640 constitute the handler of the finally clause. This try-finally clause is a method of class A 620. Regardless of whether instructions 630 are completed successfully (i.e., without error), the JVM will perform bytecodes corresponding to instructions 640. The ellipse ( . . . ) is used to signify that there are additional instructions which are not shown because the are not pertinent to the present explanation.

In general, instructions 630 set a variable "itmp" equal to the integer value 1 ("int itmp=1"). Then, a method called "tryItOut" is invoked. Following "tryItOut" the instruction "i=i+itmp" sets the variable "i" equal to the sum of its current value and the value of "itmp" (which is always 1). For example, since "i" is initialized to 7, if no other code modifies "i", the first invocation of "tryFinally" will increment "i" from 7 to 8. Then, a new object of class B is allocated, with the variable "b" being used to identify the new object, and tryItOut is called again before the method useIt() is invoked on the new object b. The sole instruction of finally handler 640 simply invokes the wrapItUp method.

Figure 7:
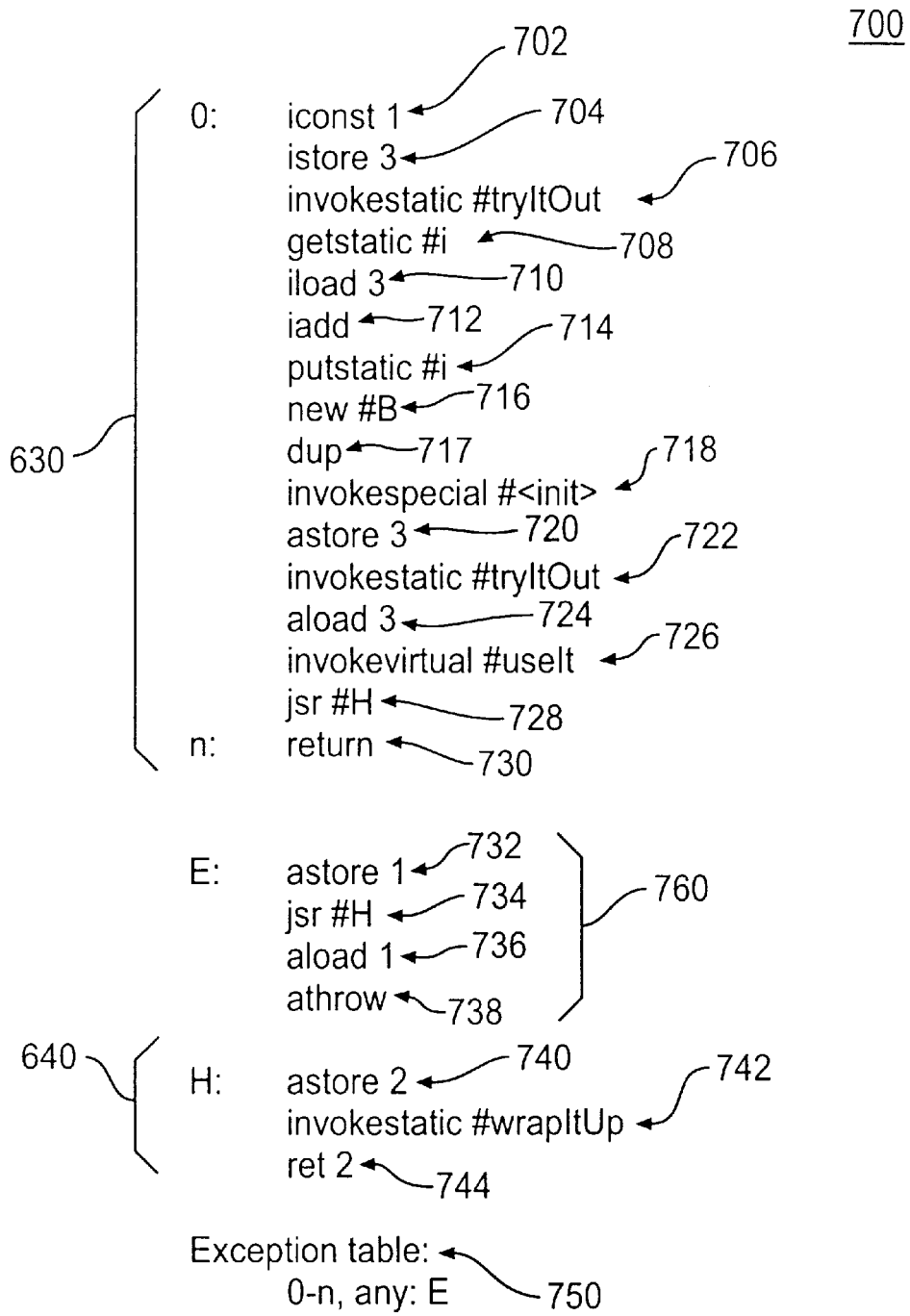
FIG. 7 is an example of compiled bytecodes for the program code of FIG. 6 with both reference-primitive value and reference-uninitialized variable conflicts.

FIG. 7 contains an example of the bytecodes 700 that a Java compiler may generate to implement the try-finally of FIG. 6 in the JVM. Those skilled in the art will recognize that an explanation of bytecodes 700 is easily discernable with reference to the JVM Specification described above.

Each bytecode has an instruction number, which is illustrated symbolically in FIG. 7 by the "0:" adjacent bytecode 702, the "n:" adjacent bytecode 730, the "E:" adjacent bytecode 732, and the "H:" adjacent bytecode 740. The "#" sign is used to show a branch to a specific sequence of bytecodes. Thus, the "#H" in bytecode 728 is used to refer to the sequence of bytecodes beginning with the bytecode at instruction number "H".

Bytecodes 702–730 comprise instructions corresponding to the try clause 630, and bytecodes 740–744 comprise instructions corresponding to the finally clause 640 of FIG. 6. The "E:" instruction number is used to show that bytecodes 732–738 comprise the error handler, or "universal exception handler," which operates when an exception or error occurs during execution of bytecodes 702–730, or the bytecodes corresponding to instruction numbers 0–n as defined in the Exception table 750.

Bytecode 702 is used to push the integer value 1 on top of the operand stack. For purposes of the following description, the term "variable" is used to refer to a stack frame slot; thus, "variable 3" means the third stack frame slot. The compiler selected variable 3 to store the value for itmp so bytecode 704 stores the value (1) from the top of the operand stack in variable 3. Bytecode 706 invokes the tryItOut method, the details of which are not shown.

Bytecode 708 pushes the value of static variable "i", which may also have a slot in the stack frame or correspond to a machine register, and bytecode 710 pushes the value stored in variable 3 on the operand stack as well so that bytecode 712 can pop both integers from the operand stack, add them together, push the result back on the operand stack. Then, bytecode 714 saves the result, which is now on the top of the operand stack, in static variable i. This set of bytecodes 708–714 corresponds to the Java instruction "i=i+itmp".

Bytecode 716 allocates space for a new object of class B, and pushes the reference or pointer where the new B can be located in the memory heap on the top of the operand stack. Bytecode 717 duplicates the top entry in the operand stack. Bytecode 718 calls a special routine that initializes the new object pointed to by the reference on the top of the operand stack. Determining that variable 3 can be reused, and perhaps to optimize execution, the compiler decides to use variable 3 again in bytecode 720 to store the reference to the new object. Bytecodes 716–720 correspond to the Java instruction "B b=new B()". Bytecode 722 invokes the routine tryItOut again before bytecode 724 pushes the reference for the new object back on the operand stack so it can be used by the useIt method, which is invoked in bytecode 726. To make sure bytecodes 740–744, which correspond to the finally clause 640, are executed when bytecodes 702–730 of the try clause are completed, the compiler sets up bytecodes 740–744 for the finally clause 640 as a separate routine, which is identified in this example by the instruction number "H" (which symbolizes the "handler"), and uses bytecode 728 to jump to the routine identified by the H.

Bytecode 740 stores in variable 2 the value of the program counter, which is the instruction number for the bytecode following the jsr 728, i.e., "n" for bytecode 730. The return bytecode signifies the end of method 600. Bytecode 742 invokes the routine for wrapItUp, after which bytecode 744 causes the JVM to restore the program counter with the value stored in variable 2, i.e., the instruction number for the bytecode following the bytecode that branched to the handler.

Exception handler 760 begins with bytecode 732 that stores a reference in variable 1 for the exception that caused entry into handler 760, which is on the top of the operand stack. To make sure the finally handler is executed even when an exception occurs, bytecode 734 causes the JVM to branch to bytecode 740. Following return to handler 760, the exception in variable 1 is pushed on the stack by bytecode 736, after which bytecode 738 throws the exception such that when an exception occurs during method execution that exception is returned to the invoker of method 600.

The example bytecodes in FIG. 7 include examples of both kinds of conflicts. Local variable 1, which is used in the universal exception handler 760 to hold the thrown exception across the jsr, causes a ref-uninit conflict. If an exception is thrown, variable 1 holds a reference in the finally clause; if no exception is thrown, it is uninitialized. The solution is to add the following two instructions to the top of the method to initialize variable 1:

aconst_null
astore 1

These instructions ensure that variable 1 holds a reference along both paths.

The second conflict is a ref-val conflict on variable 3. At compile time, the Java compiler decided that variable 3 was unused after the last use of "itmp" in the Java code, and, thus, it reused variable 3 for the object "b". But the path to the finally clause may be from an exception during the first call to "tryItOut", in which case variable 3 contains an integer, or the path to the finally clause may be after the second call to "tryItOut" raised an exception, in which case variable 3 contains a reference, specifically, to object "b". Alternatively, the path to the finally clause may be after neither invocation of tryItOut raises an exception, i.e., the try clause completes successfully, in which case variable 3 also contains the reference "b".

In accordance with one implementation of the present invention, the solution to the ref-val conflict is to rewrite uses of variable 3 as shown in FIG. 8. Bytecodes 800 include bytecodes 810 and 820 as the solution to the ref-uninit conflict with variable 1 and bytecodes 830 and 840 change the uses of variable 3 in bytecodes 720 and 724 (of FIG. 7) to variable 4, which in fact solves the ref-val conflict by eliminating the possible dual use of variable 3 for both a value and reference.

The Java bytecode instruction set includes in each instruction sufficient type information to determine whether a given instruction uses a local variable as a reference. In particular, the astore and aload instructions are the only instructions that access references in local variables, so code rewriter 400 need only search for these instructions accessing the local variable to be rewritten, correcting those to refer to a different local variable.

There is one exception to this property: the astore instruction is usually used to pop a reference (or address, hence the prefix letter a) from the operand stack and store it in a local variable, but it may also be used to do the same with return addresses pushed on the operand stack by jsr instructions. Accordingly, code rewriter 400 maintains sufficient information to determine whether the entry at the operand stack top at the point of an astore is such a return address to circumvent this complication. If the astore operates on a return address from the operand stack, code rewriter 400 ignores that instruction during the rewriting process.

Conclusion

In accordance with the present invention a virtual machine can distinguish stored references from non-references to improve exact garbage collection. This is accomplished by either adding new instructions or rewriting existing instructions, depending on the type of conflict. When it is determined that an instruction sequence t includes code defining at least two control paths leading to a common jsr subroutine and it is not possible to determine whether a variable from both paths is a reference or non-reference, and that variable is used after return from the subroutine on at least one of the paths, one or more instructions, including those from one of the paths, are rewritten to eliminate the use of the same variable as the other path and, with it, the conflict itself. By eliminating such conflicts, a garbage collector in accordance with the present invention can effectively reclaim memory space during execution of the subroutine.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method for modifying a sequence of instructions to improve memory management within a storage device during execution of the instructions, comprising the steps, performed by a processor, of:

analyzing the sequence of instructions for a conflict indicating an undeterminable variable type;

determining the type of conflict; and modifying the sequence of instructions to eliminate the conflict based on the determination.

2. The method of claim 1, wherein the analyzing step includes the substep of locating in the sequence of instructions two paths of instructions that branch to a routine.

3. The method of claim 2, wherein the analyzing step further includes the substep of determining whether an instruction from one path uses the variable in a manner different from an instruction from the second path.

4. The method of claim 2, wherein the determining step includes the substeps of ascertaining whether an instruction from the first path uses a storage location for a value; and ascertaining whether an instruction from the second path uses the storage location for a reference.

5. The method of claim 2, wherein the determining step includes the substeps of ascertaining whether an instruction from the first path uses a storage location for a reference; and ascertaining whether the second path uses the storage location.

6. The method of claim 4, wherein the modifying step includes the substep of rewriting the instruction from the first path that uses the storage location for a value to use a different storage location.

7. The method of claim 4, wherein the modifying step includes the substep of rewriting the instruction from the second path that uses the storage location for a reference to use a different storage location.

8. The method of claim 5, wherein the modifying step includes the substep of adding an instruction that initializes the storage location.

9. A method for generating a sequence of bytecodes for execution by a virtual machine, comprising the steps of:

determining whether the bytecode set includes bytecodes defining two paths branching to a routine;

determining whether a variable assignment from each path causes a conflict of unknown variable type in the routine; and modifying all bytecodes of one of the paths that cause the conflict with a new variable assignment.

10. A method for generating bytecodes executable by a virtual machine, comprising the steps of:

analyzing a sequence of bytecodes for bytecodes defining two paths in which at least one bytecode of one path uses a variable to store a primitive value and at least one bytecode of the other path uses the variable to store a reference;

determining whether both paths branch to a routine comprised of a subset of the sequence of bytecodes; and modifying the bytecode of one of the paths to use a different variable.

11. A method for modifying a sequence of instructions to improve memory management within a storage device during execution of the instructions by a virtual machine, comprising the steps of:

preprocessing a sequence of instructions;

identifying a first subset of the sequence of instructions that uses a storage location for a value;

identifying a second subset of the sequence of instructions that uses the storage location for a reference;

determining whether both subsets branch to a routine comprised of a third subset of the sequence of instructions; and modifying instructions from the first or second subset to use a new storage location.

12. A method for modifying a sequence of instructions executable by a virtual machine, comprising the steps of:

preprocessing a sequence of instructions;

identifying a first subset of the sequence of instructions that uses a variable for a reference;

identifying a second subset of the sequence of instructions;

determining whether both subsets branch to a routine comprised of a third subset of the sequence of instructions; and adding at least one instruction to the sequence of instructions to initialize the variable based on whether the variable is used by an instruction in the second subset.

13. Apparatus for modifying a sequence of instructions to improve memory management within a storage device during execution of the instructions, comprising:

a analyzing component configured to analyze the sequence of instructions for a conflict indicating an undeterminable variable type;

a determining component configured to determine the type of conflict; and a modifying component configured to modify the sequence of instructions to eliminate the conflict based on the determination.

14. The apparatus of claim 13, wherein the analyzing component includes:

a locating component configured to locate in the sequence of instructions two paths of instructions that branch to a routine.

15. The apparatus of claim 14, wherein the analyzing component further includes:

a determining component configured to determine whether an instruction from one path uses the variable in a manner different from an instruction from the second path.

16. The apparatus of claim 14, wherein the determining component includes:

a first component configured to ascertain whether an instruction from the first path uses a storage location for a value; and a second component configured to ascertain whether an instruction from the second path uses the storage location for a reference.

17. The apparatus of claim 14, wherein the determining component includes:
a first component configured to ascertain whether an instruction from the first path uses a storage location for a reference; and
a second component configured to ascertain whether the second path uses the storage location.

18. The apparatus of claim 14, wherein the modifying component includes:
a rewriting component configured to rewrite the instruction from the first path that uses the storage location for a value to use a different storage location.

19. The apparatus of claim 14, wherein the modifying component includes:
a rewriting component configured to rewrite the instruction from the second path that uses the storage location for a reference to use a different storage location.

20. The apparatus of claim 15, wherein the modifying component includes:
a component configured to add an instruction that initializes the storage location.

21. Apparatus for generating a sequence of bytecodes for execution by a virtual machine, comprising:
a first determining component configured to determine whether the bytecode set includes bytecodes defining two paths branching to a routine;
a second determining component configured to determine whether a variable assignment from each path causes a conflict of unknown variable type in the routine; and
a modifying component configured to modify all bytecodes of one of the paths that cause the conflict with a new variable assignment.

22. Apparatus for generating bytecodes executable by a virtual machine, comprising:
an analyzing component configured to analyze a sequence of bytecodes for bytecodes defining two paths in which at least one bytecode of one path uses a variable to store a primitive value and at least one bytecode of the other path uses the variable to store a reference;
a determining component configured to determine whether both paths branch to a routine comprised of a subset of the sequence of bytecodes; and
a modifying component configured to modify the bytecode of one of the paths to use a different variable.

23. Apparatus for modifying a sequence of instructions to improve memory management within a storage device during execution of the instructions by a virtual machine, comprising:
a component configured to preprocess a sequence of instructions;
an first identifying component configured to identify a first subset of the sequence of instructions that uses a storage location for a value;
an second identifying component configured to identify a second subset of the sequence of instructions that uses the storage location for a reference;
a determining component configured to determine whether both subsets branch to a routine comprised of a third subset of the sequence of instructions; and
a modifying component configured to modify instructions from the first or second subset to use a new storage location.

24. Apparatus for modifying a sequence of instructions executable by a virtual machine, comprising:
a component configured to preprocess a sequence of instructions;
a first identifying component configured to identify a first subset of the sequence of instructions that uses a variable for a reference;
a second identifying component configured to identify a second subset of the sequence of instructions;
a determining component configured to determine whether both subsets branch to a routine comprised of a third subset of the sequence of instructions; and
an instruction adding component configured to add at least one instruction to the sequence of instructions to initialize the variable based on whether the variable is used by an instruction in the second subset.

25. A computer program product comprising:
a computer usable medium having computable readable code embodied therein for modifying a sequence of instructions to improve memory management within a storage device during execution of the instructions, the computer usable medium comprising:
a analyzing module configured to analyze the sequence of instructions for a conflict indicating an undeterminable variable type;
a determining module configured to determine the type of conflict; and
a modifying module configured to modify the sequence of instructions to eliminate the conflict based on the determination.

26. A computer program product comprising:
a computer usable medium having computable readable code embodied therein for generating a sequence of bytecodes for execution by a virtual machine, the computer usable medium comprising:
a first determining module configured to determine whether the bytecode set includes bytecodes defining two paths branching to a routine;
a second determining module configureed to determine whether a variable assignment from each path causes a conflict of unknown variable type in the routine; and
a modifying module configured to modify all bytecodes of one of the paths that cause the conflict with a new variable assignment.

27. A computer program product comprising:
a computer usable medium having computable readable code embodied therein for generating bytecodes executable by a virtual machine, the computer usable medium comprising:
an analyzing module configured to analyze a sequence of bytecodes for bytecodes defining two paths in which at least one bytecode of one path uses a variable to store a primitive value and at least one bytecode of the other path uses the variable to store a reference;
a determining module configured to determine whether both paths branch to a routine comprised of a subset of the sequence of bytecodes; and
a modifying module configured to modify the bytecode of one of the paths to use a different variable.

28. A computer program product comprising:
a computer usable medium having computable readable code embodied therein for modifying a sequence of instructions to improve memory management within a storage device during execution of the instructions by a virtual machine, the computer usable medium comprising:

a module configured to preprocess a sequence of instructions;

an first identifying module configured to identify a first subset of the sequence of instructions that uses a storage location for a value;

an second identifying module configured to identify a second subset of the sequence of instructions that uses the storage location for a reference;

a determining module configured to determine whether both subsets branch to a routine comprised of a third subset of the sequence of instructions; and a modifying module configured to modify instructions from the first or second subset to use a new storage location.

29. A computer program product comprising:

a computer usable medium having computable readable code embodied therein for modifying a sequence of instructions executable by a virtual machine, the computer usable medium comprising:

a module configured to preprocess a sequence of instructions;

a first identifying module configured to identify a first subset of the sequence of instructions that uses a variable for a reference;

a second identifying module configured to identify a second subset of the sequence of instructions;

a determining module configured to determine whether both subsets branch to a routine comprised of a third subset of the sequence of instructions; and an instruction adding module configured to add at least one instruction to the sequence of instructions to initialize the variable based on whether the variable is used by an instruction in the second subset.

* * * * *